(12) United States Patent
Farkas

(10) Patent No.: US 6,563,229 B2
(45) Date of Patent: May 13, 2003

(54) STANDBY POWER SYSTEM

(76) Inventor: Otto Farkas, 1749 SE. 44th Ter., Cape Coral, FL (US) 33904

( * ) Notice: Subject to any disclaimer, the term of this patent is extended or adjusted under 35 U.S.C. 154(b) by 0 days.

(21) Appl. No.: 09/836,363

(22) Filed: Apr. 18, 2001

(65) Prior Publication Data

US 2002/0167234 A1 Nov. 14, 2002

(51) Int. Cl.⁷ .......................... H02K 23/60; F02N 11/04
(52) U.S. Cl. .......................... 290/30 A; 290/1 A; 322/4
(58) Field of Search ................. 290/1 A, 30 A; 322/4

(56) References Cited

U.S. PATENT DOCUMENTS

| | | | | |
|---|---|---|---|---|
| 3,221,172 A | * | 11/1965 | Rolison | 290/4 R |
| 3,558,901 A | | 1/1971 | Jacobus | 290/30 R |
| 3,609,426 A | * | 9/1971 | Gaul | 322/4 |
| 3,631,670 A | * | 1/1972 | Vassilakis | 60/500 |
| 3,675,112 A | | 7/1972 | Smith | 322/4 |
| 3,981,638 A | * | 9/1976 | Hutterer | 418/34 |
| 4,439,720 A | | 3/1984 | Georges | 322/4 |
| 4,460,834 A | | 7/1984 | Gottfried | 307/64 |
| 4,498,015 A | * | 2/1985 | Gottfried | 290/15 |
| 4,525,661 A | * | 6/1985 | Mucsy et al. | 322/4 |
| 4,831,277 A | * | 5/1989 | Christopher | 290/1 A |
| 4,857,755 A | | 8/1989 | Comstock | 307/47 |
| 6,020,657 A | * | 2/2000 | Liran | 307/64 |
| 6,133,716 A | * | 10/2000 | Schutten | 322/40 |
| 6,232,671 B1 | * | 5/2001 | Gottfried, Jr. | 290/1 R |

FOREIGN PATENT DOCUMENTS

| | | | | |
|---|---|---|---|---|
| JP | | 1151741 A | * | 7/1981 |
| JP | | 56086005 A | * | 6/1989 |

* cited by examiner

Primary Examiner—Joseph Waks
(74) Attorney, Agent, or Firm—Terry M Gernstein

(57) ABSTRACT

A standby power system includes a flywheel that rotates in a horizontal plane and is coupled to an engine and a motor/generator that have horizontally oriented shafts which rotate in vertical planes. A coupling changes the direction of rotation to couple the flywheel to the engine and/or to the motor/generator. The flywheel can rotate at speeds different from the speeds of rotation of the shafts and several systems can be ganged together to supply power. The coupling can include mechanical, electromechanical and hydraulic elements.

20 Claims, 7 Drawing Sheets

STANDBY POWER SYSTEM

TECHNICAL FIELD OF THE INVENTION

The present invention relates to the general art of electrical transmission or interconnection systems, and to the particular field of substitute or emergency power supplies.

BACKGROUND OF THE INVENTION

In many instances, it is desirable to provide an emergency power system which will automatically supply continuous auxiliary electric power when a main source of power, such as a utility, falls below a certain level. This situation may be caused by a power loss at the utility, a break in a supply line or the like. There are many examples of situations that require a continuous supply of power, even when a main source of power is down. Hospitals, telecommunications centers, industrial plants, as well as any computer user all require a continuous source of power. Interruptions in power can damage delicate electronic instruments as well as wipe out computer memories. The loss of all or a portion of a main power supply occurs in the United States, and can be common in developing countries.

Therefore, the art has several examples of auxiliary power sources. However, it is not sufficient to merely supply power to a load during main power supply downtime, such power should be supplied in a manner that is most efficient and does not damage equipment during a changeover from the main power source to the auxiliary power source. Many delicate electronic instruments are sensitive to spikes, or other less severe variations, in power, even if the spikes are quite small. This is especially true if the equipment is subject to a number of such spikes which might occur if the main power source is subject to variations in output.

Therefore, there is a need for an auxiliary power source that can take over supplying power to a load when a main source of power goes away or falls below a specified limit and does so in a manner that is smooth and does not create a spike during a changeover from the main supply to the auxiliary supply.

In the case of large loads, the art has suggested using generators that are driven by engines to supply the auxiliary power to the load. The engines are often thermal power engines, such as internal combustion engines, diesel engines or the like. However, even a well-primed and pre-heated thermal engine can require as much as two to three seconds to come up to operating speed and cannot assume full load until such time as it is operating at its operating speed. Thus, there is a delay in switching over to such engine-driven auxiliary power supplies that is associated with an inherent condition of the engine that cannot be changed in any significant manner.

However, two to three seconds is an eternity when electronic equipment is concerned. During that delay time, electronic memories can be totally lost, equipment shut off in a manner that damages that equipment or equipment associated therewith, and significant spikes developed, among many other undesirable results.

Therefore, there is a need for an auxiliary power system that can provide power to a load as quickly as necessary to maintain electronic components in an operating condition even during the switch over from main power to auxiliary power.

The art also contains examples of auxiliary power systems that utilize flywheels in connection with the auxiliary power system. These systems convert the kinetic energy of a rotating mass into electrical power during the change over from the main power source to the power supplied by an auxiliary engine driving a generator connected to the lines used to transfer power to a load, or loads. Most flywheel systems are not sufficient to supply power to large loads such as might be found in large businesses or the like, even for the short time associated with a change over to an auxiliary power system.

Therefore, there is a need for an auxiliary power system that can accommodate large loads during a change over from a main power system to an auxiliary power system and can provide a smooth transition.

Still further, since the energy associated with a rotating flywheel is directly proportional to the mass as well as directly proportional to the square of the velocity of rotation, more energy can be realized from such a rotating flywheel by increasing its size and/or increasing its speed of rotation. Increasing the size of a flywheel is not as efficient as increasing the speed of rotation due to the relationship between mass and energy and between velocity and energy. However, even beyond that, increasing the size of a flywheel may not be efficient from the standpoint of the structures associated with the flywheel. These structures must be large enough to accommodate the flywheel and if large amounts of energy are required from the flywheel, the structures associated with the flywheel may become unwieldy.

However, some flywheel speeds in flywheels associated with prior art systems are limited by the speed of rotation of the equipment associated with the flywheel.

Therefore, there is a need for a standby power generating system that makes efficient use of a flywheel.

The inventor of the present invention has observed that a flywheel rotating in a horizontal plane can be safely operated at a rotational speed greater than a flywheel mounted to rotate in a vertical plane. However, most engines and motor/generator units suitable for use in an auxiliary power system have shafts that are mounted to rotate in a vertical plane. Accordingly, it may be difficult and complicated to adapt a flywheel rotating in a horizontal plane to couple to a shaft that is rotating in a vertical plane. Yet, such horizontally rotating flywheel is most useful in auxiliary power systems associated with large loads.

While the art does contain some examples of auxiliary power systems having large flywheels, such systems have many parts, are complex, expensive, not fully reliable and often take up a large amount of space, while not being as efficient as possible.

Therefore, there is a need for an auxiliary power system that can accommodate large loads during a change over from a main power system to an auxiliary power system and can provide a smooth transition and is simple, reliable, inexpensive and makes efficient use of space.

Still further, many engines used in existing auxiliary power supply systems are designed to operate at 2200 rpm for maximum horsepower, torque and fuel efficiency. However, many motor/generators used in such systems are designed to operate at 1500 to 1800 rpm to generate power in the 50 Hz to 60 Hz range required for most industrial loads. Accordingly, the engines used in existing auxiliary power systems must be de-rated in horsepower and thus lose efficiency.

Therefore, there is a need for an auxiliary power system that can use existing engines without de-rating those engines whereby engine efficiency is not compromised by use in such auxiliary power systems.

Overall, there is a need for a cost-effective, reliable engine integrated system that can utilize a high capacity flywheel and extract all useable energy from the flywheel while maintaining a generator output constant for a wide range of conditions.

OBJECTS OF THE INVENTION

It is a main object of the present invention to provide an auxiliary power source that can take over supplying power to a load when a main source of power goes away or falls below a specified limit and does so in a manner that does not adversely affect the load.

It is another object of the present invention to provide an auxiliary power source that can take over supplying power to a load when a main source of power goes away or falls below a specified limit and does so in a manner that is smooth and does not create a spike during a changeover from the main supply to the auxiliary supply.

It is another object of the present invention to provide an auxiliary power system that can provide power to a load as quickly as necessary to maintain electronic components in an operating condition even during the switch over from main power to auxiliary power.

It is another object of the present invention to provide an auxiliary power system that can accommodate large loads during a change over from a main power system to an auxiliary power system and can provide a smooth transition.

It is another object of the present invention to provide an auxiliary power system that can accommodate large loads during a change over from a main power system to an auxiliary power system and can provide a smooth transition and is simple, reliable, inexpensive and makes efficient use of space.

It is another object of the present invention to provide an auxiliary power system that can use existing engines without de-rating those engines whereby engine efficiency is not compromised by use in such auxiliary power systems.

It is another object of the present invention to provide an auxiliary power system that can accommodate large loads during a change over from a main power system to an auxiliary power system and makes efficient use of a flywheel.

It is another object of the present invention to provide an auxiliary power system that can use existing engines and makes efficient use of a flywheel.

It is another object of the present invention to provide a cost-effective, reliable engine integrated system that can utilize a high capacity flywheel and extract all useable energy from the flywheel while maintaining a generator output constant for a wide range of conditions.

It is another object of the present invention to provide a no-break emergency power system for large critical loads.

SUMMARY OF THE INVENTION

These, and other, objects are achieved by an auxiliary power supply system that can safely accommodate a large flywheel and can couple an engine operating at its rated capacity to a motor/generator unit that is sized to provide power at a desired level and frequency, even if that level and frequency are associated with a motor/generator operation at a capacity different from the rated capacity of the engine. Such a system will be able to smoothly and efficiently transfer power from a main source to the auxiliary source even if large amounts of power are required.

Specifically, the auxiliary power system embodying the present invention includes a large flywheel that is mounted to rotate in a horizontal plane, and a coupling unit that can efficiently couple an engine output shaft that is rotating in a vertical plane to an input/output shaft of a motor/generator that is also rotating in a vertical plane and to the horizontally rotating flywheel.

The coupling unit also permits matching the output of the engine to the desired input of the motor/generator while allowing the engine to operate at its most efficient level. The system of the present invention also permits a flywheel to operate at any selected rotational speed, even if that speed differs from the output rotational speed of either the engine or the motor/generator. Still further, the auxiliary power unit of the present invention is amenable to being ganged together with other auxiliary power units to provide large amounts of power when necessary.

BRIEF DESCRIPTION OF THE DRAWING FIGURES

DETAILED DESCRIPTION OF THE PREFERRED EMBODIMENT OF THE INVENTION

Other objects, features and advantages of the invention will become apparent from a consideration of the following detailed description and the accompanying drawings.

Figure 1:
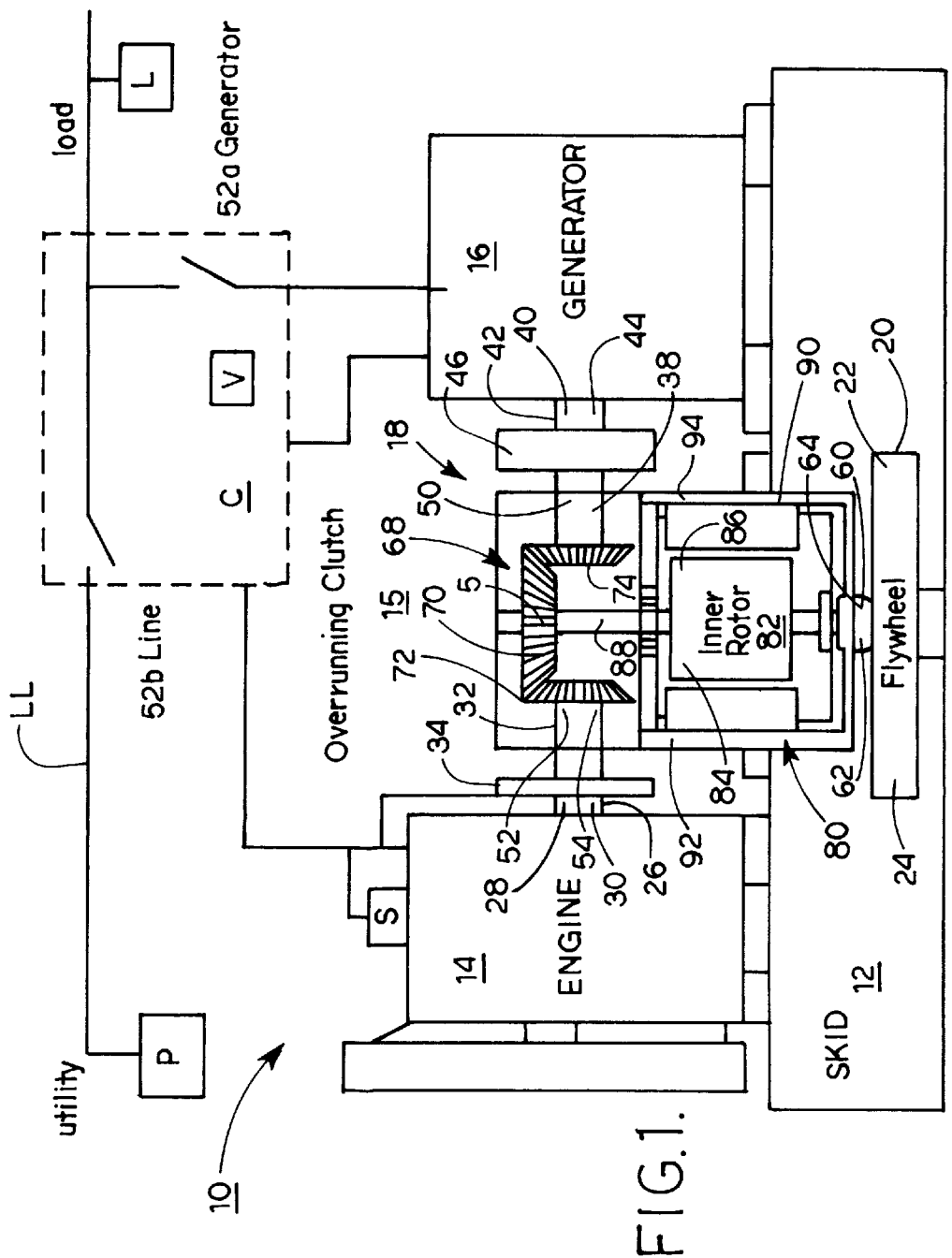
FIG. 1 is a schematic showing an auxiliary power system embodying the present invention in which a horizontally rotating flywheel is coupled to vertically rotating shafts of an engine and a motor/generator by a special coupling unit of the present invention.

Shown in FIG. 1 is a first form of a standby power generating system 10 embodying the present invention. A load L such as a hospital, business or the like is powered from a main power source P, such as a utility or the like via a load line LL. During normal operation of power source P, load L receives all of its power via load line LL from source P. However, in various situations, such as storms, equipment failure or the like, there are times when the power level from source P drops below a value that can safely power the equipment represented by load L. This value can be pre-set according to the equipment represented by load L. When the power level from source P drops below this pre-set level, system 10 will take over and supply the necessary power to load L via line LL. Until that time, system 10 is in a stand-by mode. A control unit C monitors the power supply characteristics in load line LL and controls the switch over from the main power source P to auxiliary power source 10 if the power characteristics in load line LL drop below pre-set values. Control unit C includes the systems and elements used in such sensing and control units and thus will not be further discussed in detail.

As discussed above, transfer of power from source P to system 10 should be smooth and achieved in a manner that will not damage sensitive electronic equipment in load L, yet system 10 should be large enough to supply large loads. System 10 achieves both of these results while remaining safe, reliable and convenient to use.

As shown, system 10 includes a frame or skid 12 that supports the entire system as a single unit. An engine 14 is mounted on frame 12 and is coupled to a motor/generator 16 via a coupling unit 18 to drive motor/generator 16 as a generator during use of system 10 as a source of power for load L during outages or downtimes for source P. A flywheel 20 is also mounted on frame 12 and is coupled to both engine 14 and motor/generator 16 by coupling unit 18. Flywheel 20 is mounted to rotate in a horizontal plane so large flywheels rotating at high speeds can be used in system 10. The horizontal plane rotation of flywheel 20 is indicated by rotation direction indicators 22 and 24.

The flywheel must have sufficient energy to supply power during the time the engine is attaining operating conditions. However, in some cases, such as large loads, the flywheel must supply large amounts of energy. Since such energy varies directly with the mass of the flywheel and directly with the square of the velocity of rotation, it is more efficient to rotate the flywheel at high speeds rather than to try to provide a larger flywheel. This is especially true if the power supplied is quite large. Accordingly, the system of the present invention permits variation of the speed of rotation of a flywheel whereby the power supplied may be varied in an efficient manner and smaller flywheels can be used in place of a flywheel that is very large but rotating at lower speeds. Because the flywheel is mounted to rotate in a horizontal plane, the flyweel can have a large mass; however, to further increase the efficiency of the flywheel, the system of the present invention permits the flywheel to operate at the most efficient speed as well even if the engine and/or the motor/generator operate at different speeds.

As shown in FIG. 1, engine 14 has an output shaft 26 that is horizontally oriented and rotates in a vertical plane as indicated by rotation indicators 28 and 30 and is coupled to a shaft 32 by a clutch 34. As is also shown in FIG. 1, motor/generator 16 includes a horizontally extending input/output shaft 40 that rotates in a vertical plane as indicated by rotation indicators 42 and 44. The horizontal planes containing shafts 26 and 40 need not be the same. A clutch 46 couples input/output shaft 40 to a shaft 50. Shafts 32 and 50 rotate in a vertical plane as indicated by rotation direction indicators 52–58.

Flywheel 20 includes a main axle 60 that rotates in a vertical plane as indicated by rotation direction indicators 62 and 64. Since flywheel 20 rotates in a horizontal plane and shafts 32 and 50 rotate in vertical planes, the direction of rotation for these elements must be changed by 90° to couple these elements together. This directional change is achieved in system 10 by coupling unit 18 which includes a gear unit 68 having mechanical gears, such as gears 70, 72 and 74. These gears are bevel gears having Mitre bevels and gears 70/72 and 70/74 have intersecting axes that intersect at an angle of 90° to change the direction of rotation of shafts 32 and 50 from being in the vertical plane to being in the horizontal plane so such rotation can be transferred to flywheel 20. As will occur to those skilled in the gear art, other gear forms can be used to change direction of rotation and the bevel gears shown in FIG. 1 should not be understood as a limitation on the scope of this disclosure.

Coupling unit 18 further includes an electromagnetic coupling 80 which couples the rotation of gear unit 68 to flywheel 20. Coupling 80 includes an inner rotor 82 mounted to rotate in a horizontal plane as indicated by rotation direction indicators 84 and 86 and is fixed to a vertically extending shaft 88 that, in turn, is fixed to gear 70 for rotation therewith. In this manner, rotation of gear 70 is transmitted to inner rotor 82 via shaft 88. An outer rotor 90 is mounted on frame 12 for rotation in a horizontal plane as indicated by rotation direction indicators 92 and 94 and is caused to rotate by the electromagnetic coupling between inner rotor 82 and outer rotor 90 in a manner known to those skilled in the art whereby rotation of inner rotor 82 is transferred to outer rotor 90 to cause rotation of outer rotor 90 at rotational speeds dependent on the coupling between the inner and outer rotors. The rotor coupling can be adjusted by adjusting the design of the rotors as is known to those skilled in the art.

Outer rotor 90 is a squirrel cage type rotor and is fixed to shaft 60 to transfer rotation of the rotor to the flywheel, and vice versa as will be discussed below.

Engine 14 is a thermal engine, which can be an internal combustion engine, a diesel engine or the like and includes a starter S that can be battery operated or the like and which is connected to control unit C to start the engine as soon as a power outage or drop in main power is detected by unit C. Engine 14 will drive output shaft 26 to rotate gear 72 when standby generator system 10 is operating in a power supply mode.

Motor/generator 16 is a type known to those skilled in the art and operates at 1500 to 1800 rpm to deliver power at 50 Hz to 60 Hz to load L via power line LL when system 10 is operating in the power supply mode. In this mode, motor/generator 16 is driven by input/output shaft 40 which, in turn, is driven by engine 14 via gear unit 68. The gear ratios of the gears in unit 18 can be selected to match the output speed of engine 14 to the input speed necessary to drive motor/generator 16 at the desired level. For example, if engine 14 operates most efficiently at 2200 rpm and motor/generator 16 operates most efficiently at 1500 rpm, gear unit 68 adjusts the gear ratios of gears 70, 72 and 74 to make this adjustment. Accordingly, both engine 14 and motor/generator 16 can operate at the most efficient levels. Clutches 34 and 46 are also controlled by control unit C to control the rotational torque associated with operations of engine 14 and motor/generator 16.

As discussed above, it is very important in many applications, such as when load L includes sensitive electronic equipment, that the transfer of power from main source P to standby source 10 be smooth and not include a spike. As was also discussed above, it often takes several seconds for engine 14 to come on line at full power. Therefore, system 10 includes flywheel 20 to supply power to load L during the time between control unit C detecting the need for auxiliary power and the time engine 14 reaches an operating condition. Energy associated with rotation of flywheel 20 is translated into electrical energy to be used by system 10 during the transfer of power from source P to system 10. Accordingly, flywheel 20 is constantly rotated during the standby phase of system 10 use. Flywheel 20 is large enough so that it continues to rotate even after power to the flywheel is stopped. The flywheel is large enough so that the continued rotation is sufficient to allow system 10 to supply power to load L for a short time between the drop in power from source P to the time when system 10 can supply power to load L at levels sufficient to safely operate load L. This provides uninterrupted power to load L.

To this end, motor/generator 16 operates as a motor during the standby phase of system 10 operation and supplies power to rotate flywheel 20 during standby operation. Thus, during standby operation of system 10, power from line LL is used to drive motor/generator 16 as a motor. Operation of motor/generator 16 as a motor rotates input/output shaft 40 which is operating as an output shaft, which rotation is transferred to gear 70 via gear 74 of gear unit 68. Rotation of gear 70 is then transferred to inner rotor 82 of coupling 80 which then transfers this rotation to outer rotor 90 via the electromagnetic coupling between these two elements. Rotation of outer rotor 90 is transferred to flywheel 20 to rotate that flywheel under the influence of motor/generator 16 operating as a motor. Clutch 46 is engaged and clutch 34 is disengaged so rotation of shaft 40 is transferred to flywheel 20 but not to shaft 26 and engine 14. Suitable gears can be used to rotate the flywheel at any speed with the outer rotor operating at any speed.

As soon as control unit C senses power in line LL dropping below a pre-set limit, or any other condition that is programmed into controller C that is deemed necessary to use auxiliary power, control unit C signals motor/generator 16 to change mode from a motor to a generator, and signals engine 14 to start. Switch 52a is closed at all times, and switch 52b is opened. Switch 52a can be used to isolate system 10 if desired.

During the time engine 14 is coming up to the desired operating speed, power is supplied by system 10 by using the rotation of flywheel 20 to drive motor/generator 16 via rotation of input/output shaft 40 which is now operating as an input shaft. There is sufficient rotational momentum in flywheel 20 to drive motor/generator 16 as a generator supplying sufficient power to load L until engine 14 reaches operating condition. As soon as engine 14 is up to speed, control unit C causes clutch 34 to engage and rotation from shaft 26 is transferred to shaft 40 to drive motor/generator 16 as a generator to power load L. Rotation of shaft 26 is also transferred to flywheel 20 via gear unit 68 and coupling 80 to bring flywheel 20 back up to speed as that flywheel will have lost rotational speed during the ride-through time between power from source P dropping to or below the pre-set level and engine 14 reaching its operating condition. It is also noted that control unit C can include a voltage regulator V to ensure that power supplied by system 10 is properly adjusted to the needs of load L.

Once source P comes back on line, or power from source P exceeds the pre-set limit, or the condition causing the switch over to system 10 is cleared, control unit C will reverse the process. Thus, once control unit C senses that load L can be safely powered from source P, that control unit, disengages clutch 34, places engine 14 back into a standby condition, changes motor/generator 16 from a generator condition to a motor condition and makes any other changes required to place system 10 back into a standby mode. As discussed above, in the standby mode, flywheel 20 is driven by motor/generator 16 operating as a motor whereby rotational energy is maintained in flywheel 20 during the standby condition of system 10.

Figure 2:
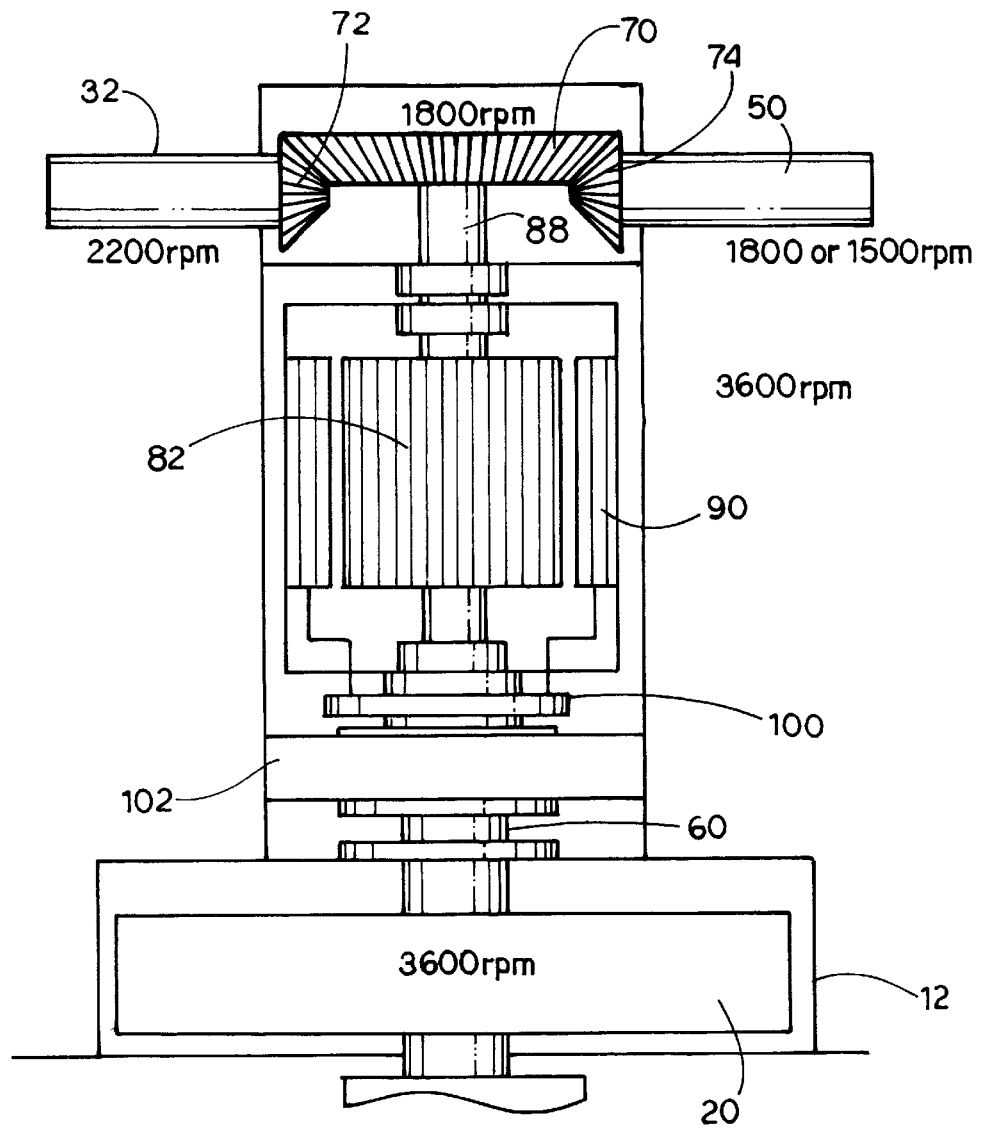
FIG. 2 is an enlarged schematic showing a coupling unit embodying the present invention.

Referring to FIG. 2, it can be understood that coupler unit 18 can transfer power delivered by shaft 32 connected to the engine at 2200 rpm to rotate flywheel 20 at 3600 rpm and to input/output shaft 40 of the motor/generator at 1500 to 1800 rpm. It is also noted that a rectifier assembly 100 and an exciter assembly 102 can be included to condition power applied to the electromagnetic coupling in a manner that will be understood by those skilled in the art based on the teaching of the present disclosure. It can be understood from FIG. 2 that gear unit 68 controls the relative rotational speeds between shafts 32 and 50 and electromagnetic coupling unit 80 controls the relative rotational speeds between gear 70 and flywheel 20.

Figure 3:
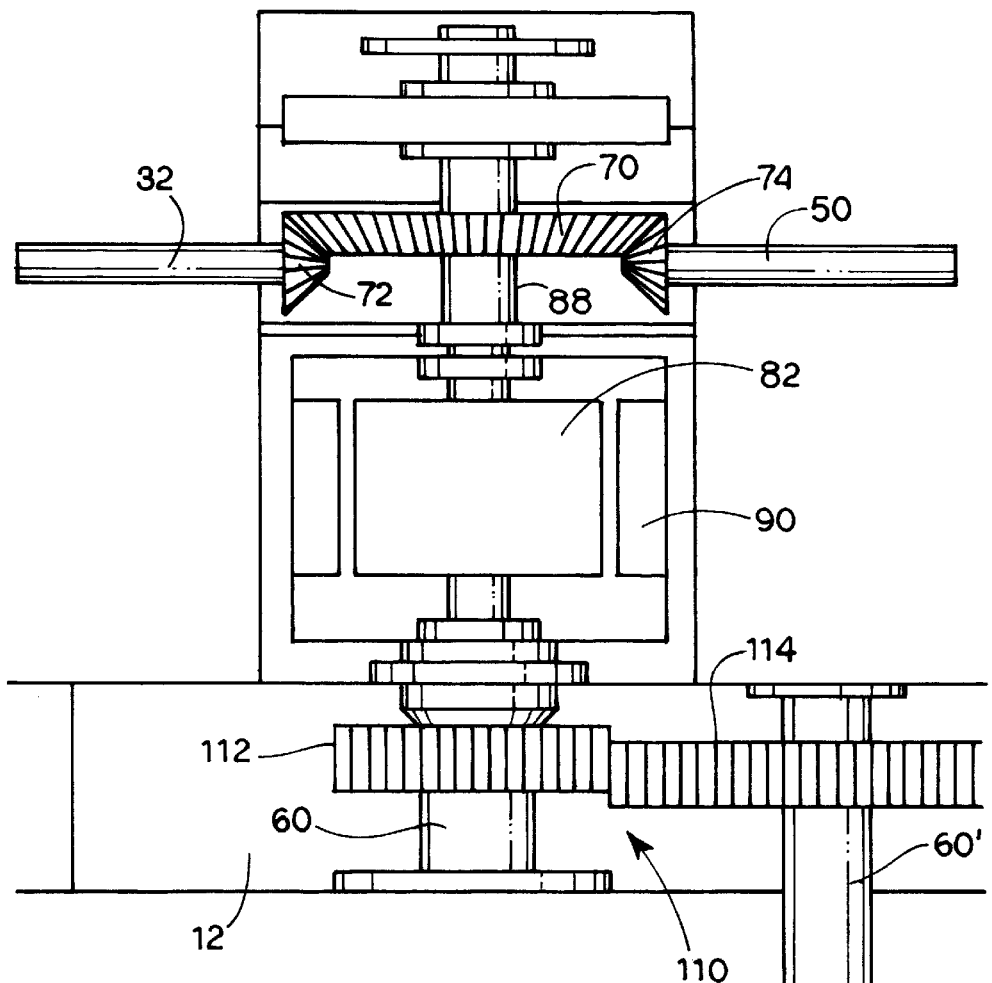
FIG. 3 is a schematic showing an alternative form of a coupling unit of the present invention in which a flywheel is coupled to the engine and to the motor/generator to rotate at a rotational speed different from the rotational speed of the shafts associated with the engine and/or the motor/generator.

Yet another way of controlling the rotational speed of the flywheel is shown in FIG. 3 in which a gear system 110 couples shaft 60 to a shaft 60' on which the flywheel is fixed. Gear system 110 includes a first gear 112 fixed to shaft 60 for rotation therewith, and a second gear 114 fixed to shaft 60' for rotation therewith. The gear ratio between gears 112 and 114 is adjusted to control the speed of rotation of the flywheel. For example, by adjusting the gear teeth in gears 112 and 114, a rotational speed for shaft 60 of 1800 rpm can be upped to a rotational speed of 3600 rpm for shaft 60' and hence for the flywheel. Other relative rotational speeds as well as other gear arrangements can be used as well.

Figure 4:
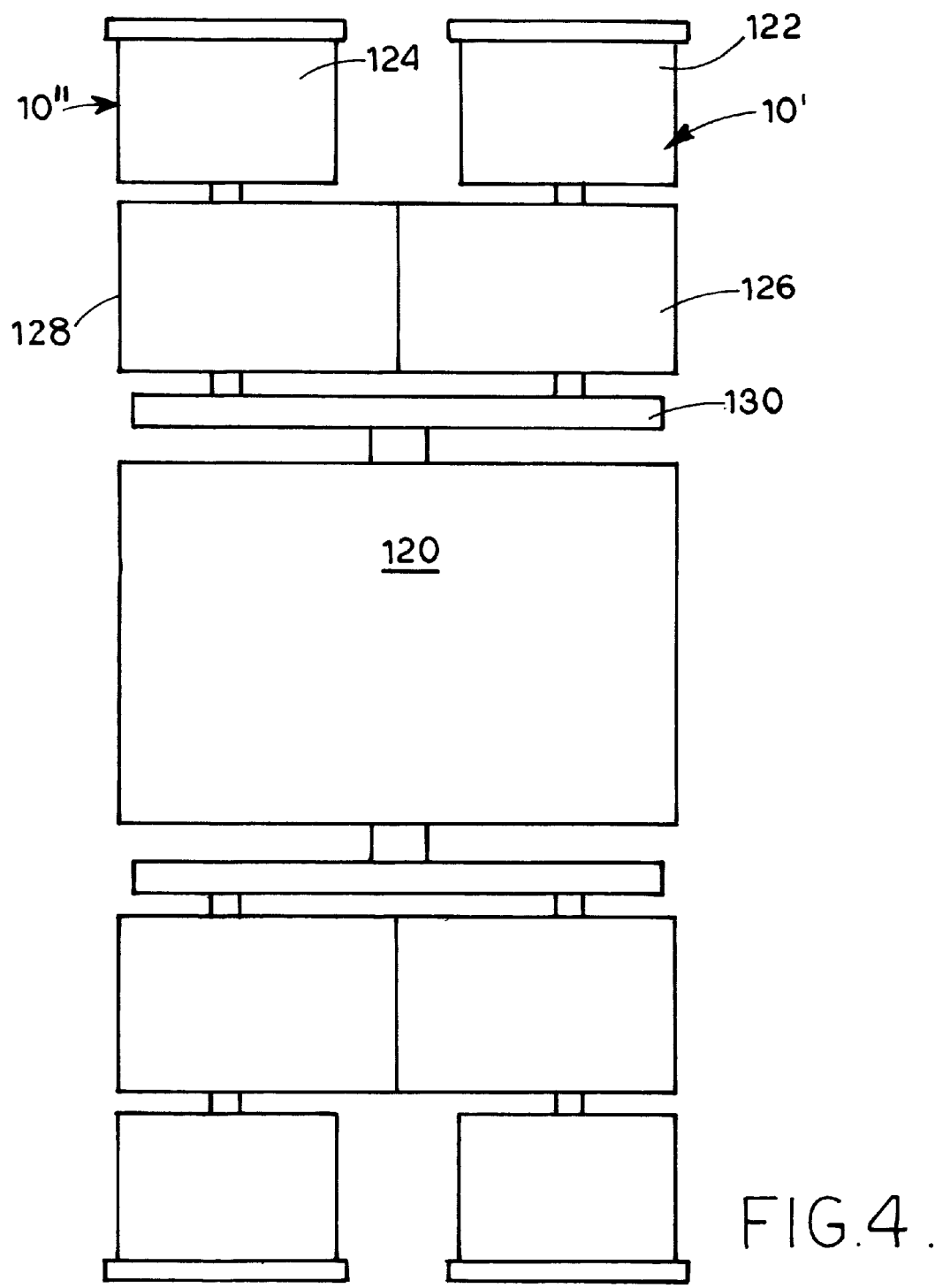
FIG. 4 is a schematic showing ganged auxiliary power generating units.
Figure 5:
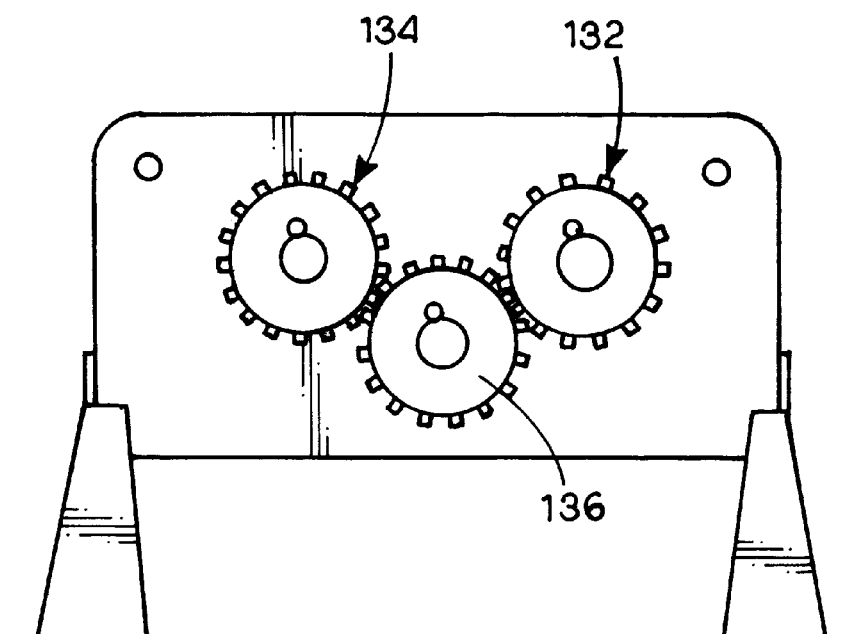
FIG. 5 is an elevational view showing a unit for connecting two engines together to drive a single generator whereby standby power generating systems can be ganged together to power large loads.
Figure 6:
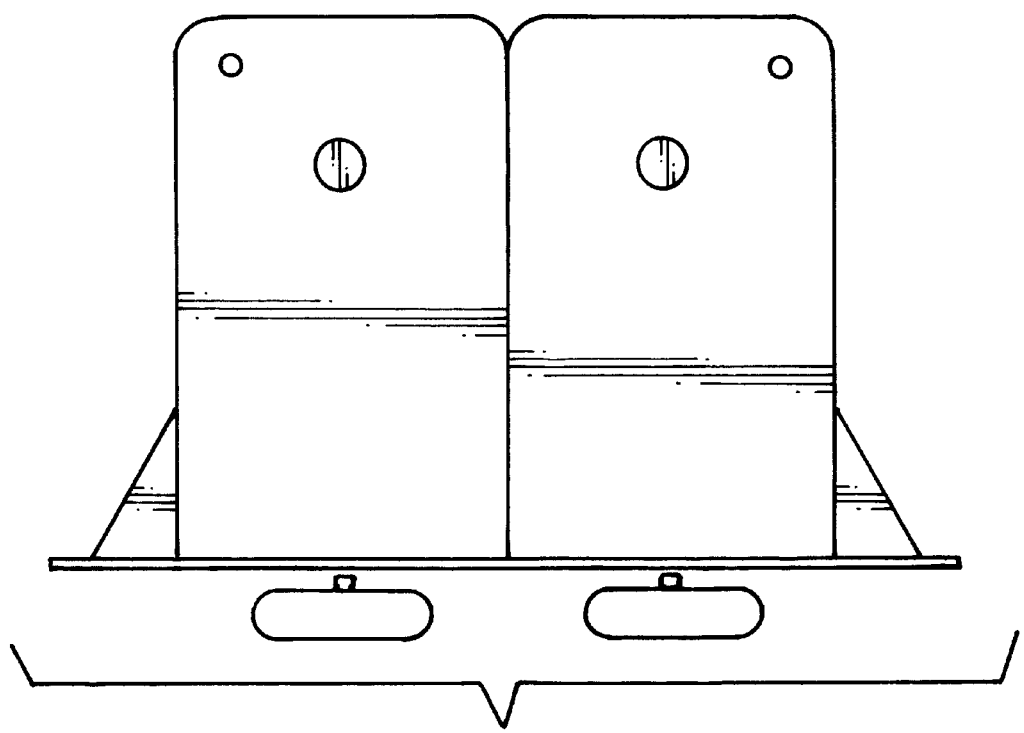
FIG. 6 is another view of a ganged system of standby power generating systems.
Figure 7:
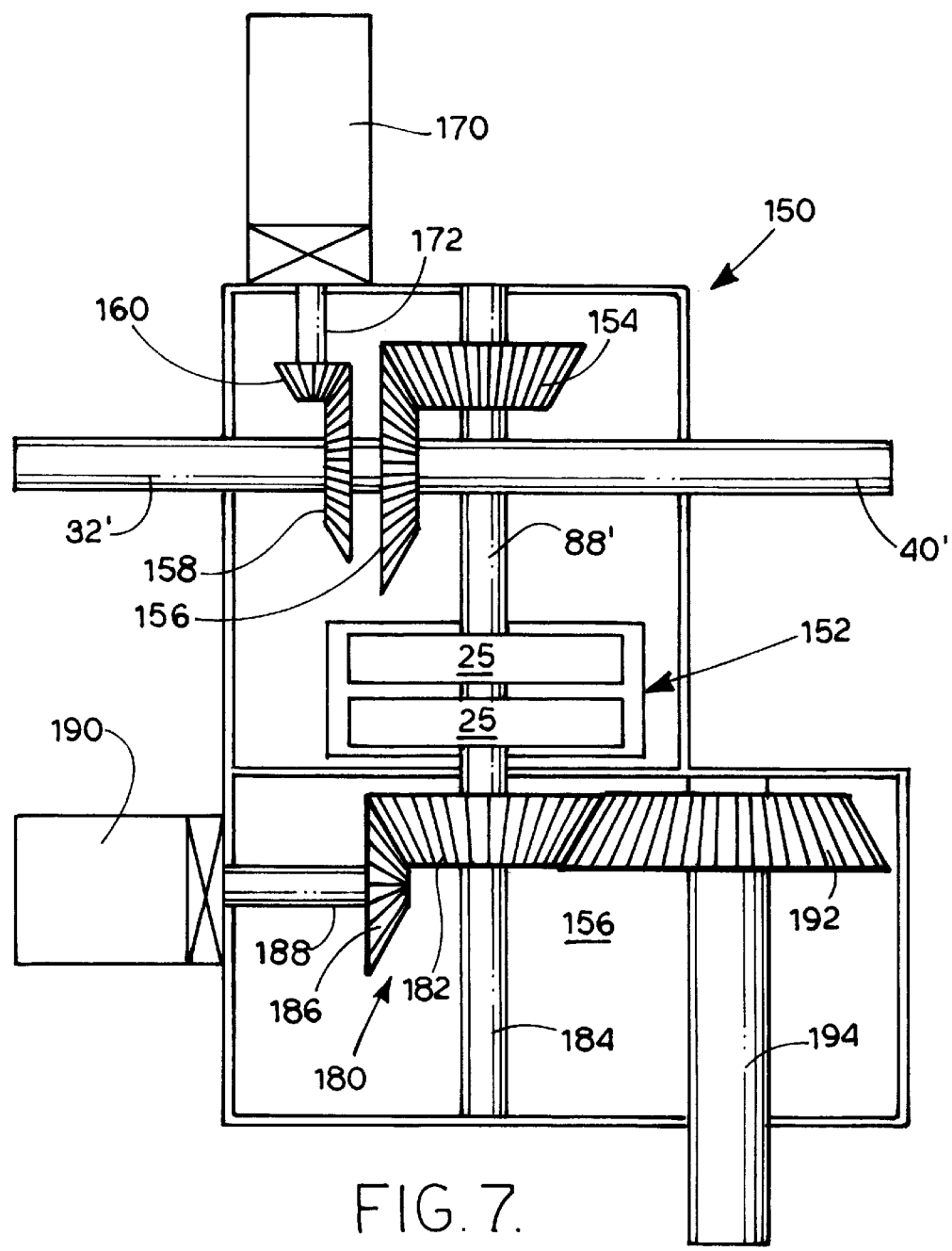
FIG. 7 is a schematic showing another form of a coupling unit of the present invention in which a flywheel is coupled to the engine and to the motor/generator to rotate at a rotational speed different from the rotational speed of the shafts associated with the engine and/or the motor/generator, and a hydraulic system is used in connection with the standby power generating system.

As mentioned above, some loads are very large and may require a power level that exceeds the capability of a single system 10. Accordingly, as shown in FIGS. 4–6, the present invention contemplates combining a plurality of standby power generating systems to power such large loads. As indicated in FIG. 4, a single large generator 120 can be powered by several smaller systems by ganging together these systems. For example, referring also to FIGS. 5 and 6, the output of a motor/generator 122 for one system 10 can be added to the output of a second motor/generator 124 of a second system 10" by suitable gear units 126, 128 and 130 to drive generator 120. As illustrated in FIGS. 5 and 6, output of the motor/generator 122 of system 10' is associated with gear 132 while output of the motor/generator 124 of system 10" is associated with gear 134. Gears 132 and 134 engage a gear 136 of gear unit 130 which is connected to generator 120. Gear units 126 and 128, as well as gears 132–136 can be mechanical, electromagnetic or hydraulic as suitable. In this manner, a plurality of systems can be ganged together to produce sufficient power for the purpose of safely powering a load while a main power source is down. The systems used in this ganged manner operate in the manner discussed above using the horizontally rotating flywheel driven by a 90° gear unit.

Yet another form of the standby power generating system of the present invention uses hydraulic units to control the transfer of rotation between the engine and the motor/generators of the systems. An angled drive unit 150 couples the engine and the motor/generator and the flywheel of a standby power generating system. A friction clutch 152 couples an upper unit 154 to a lower unit 156, and when the clutch is engaged, the flywheel is connected to the engine and/or to the motor/generator. Unit 150 includes a first set of Mitre beveled gears 154 and 156 and a second set of Mitre beveled gears 158 and 160, with gear 158 being fixed to output shaft 32' associated with the engine and controlling movement of shaft 32'. When gears 154 and 156 are engaged, rotation of shaft 32' will be transferred to shaft 88' which is at an angle of 90° to shaft 32' and to shaft 40'. A variable displacement hydraulic pump/motor 170 includes a shaft 172 connected to gear 160.

Lower unit 156 includes a gear unit 180 having a first gear 182 fixed to a shaft 184 that is rotationally mounted to rotate in a horizontal plane, a second gear 186 mounted on a shaft 188 of a pump 190 and a third gear 192 mounted on a shaft 194 that is connected to a flywheel to rotate therewith.

Figure 8:
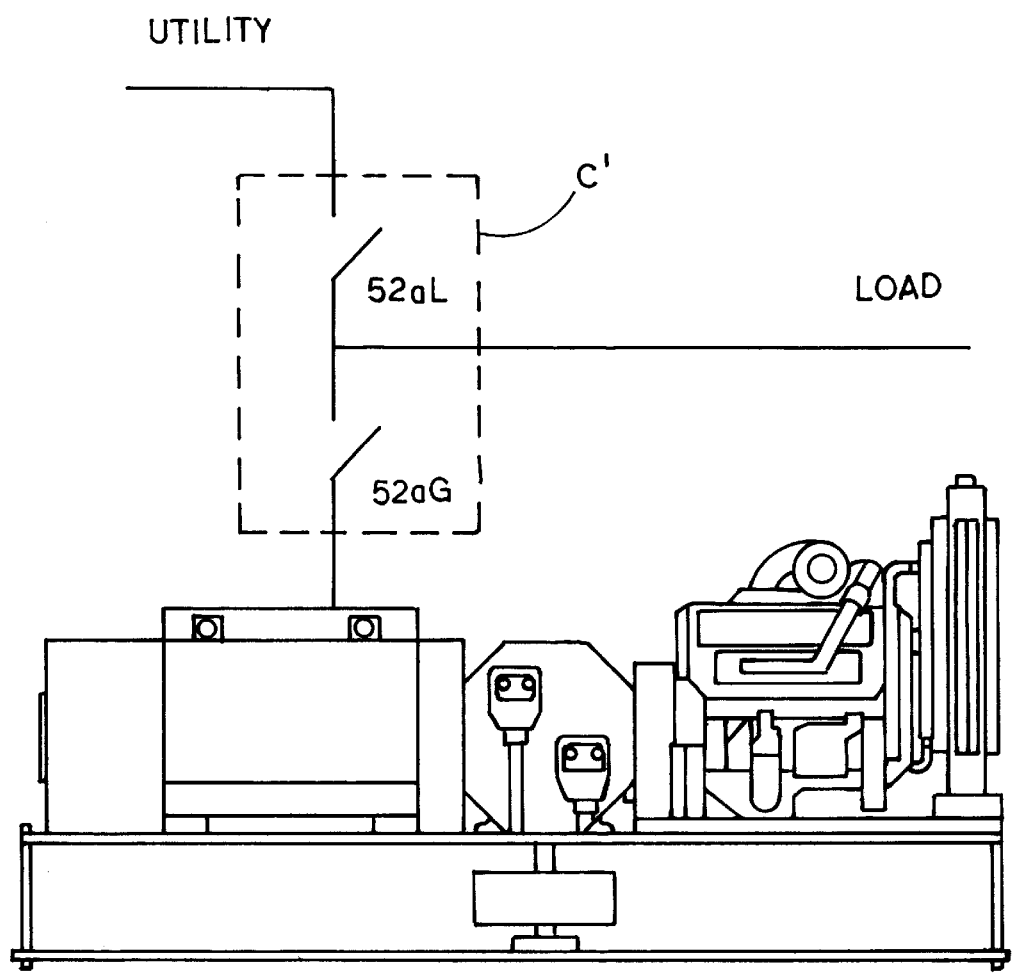
FIG. 8 is a schematic showing an auxiliary power supply system in which the coupling between a horizontally rotating flywheel and vertically rotating shafts of the engine and/or the motor/generator is an alternative to the coupling shown in FIGS. 1–3 and includes hydraulic elements in place of gears.

When the power from the main source is sufficient, the standby power generating system is in a standby mode and synchronous motor 170 drives the flywheel via shaft 172, gears 160/158, gears 156/154, shaft 88', engaged clutch 152, shaft 184, gears 182/192 and shaft 194. However, upon power from a main source dropping below a pre-set value, pump 190 and motor 170 are operated to permit the flywheel to drive shaft 40' during the start-up, ride through period for the engine. Once the engine is up to speed and operating pressure is achieved, clutch 152 is opened and shafts 32' and 40' are driven by motor 170 with energy supplied by the flywheel through pump 190. As the flywheel slows, the pump supplies constant volume and pressure by changing the pump displacement. When the engine comes on line, the hydraulic functions are reversed to recharge the flywheel and bring it back to its desired rotational speed, at which time clutch 152 is closed and pump 190 and motor 170 are de-clutched. The overall setup utilizing this hydraulic embodiment is shown in FIG. 8. A controller C' controls operation of the pumps, motors and clutches in accordance with conditions sensed by the controller and set by programs or the like into the controller. The operation of the hydraulic system per se will not be more fully disclosed, but reference is made to disclosures such as U.S. Pat. Nos. 3,558,901, 3,675,112 and 4,857,755, the disclosures of which are incorporated herein by reference.

It is understood that while certain forms of the present invention have been illustrated and described herein, it is not to be limited to the specific forms or arrangements of parts described and shown.

What is claimed is:

1. A standby power generating system comprising:

A) a frame;

B) an engine mounted on said frame and having an output shaft;

C) a motor/generator mounted on said frame and having an input/output shaft and being connected to a load that is powered from a main power source;

D) a flywheel mounted on said frame to rotate in a horizontal plane; and

E) a coupling unit coupling together said engine, said motor/generator and said flywheel and including
  (1) a gear unit which includes
    (a) a first gear on the output shaft of said engine,
    (b) a second gear on the input/output shaft of said motor/generator,
    (c) a third gear meshed with said first and said second gears, and
  (2) an electromagnetic coupling which includes
    (a) an inner rotor mounted to rotated in a horizontal plane and including a main shaft coupled to said third gear so that said inner rotor rotates with said third gear,
    (b) an outer rotor mounted to rotate in a horizontal plane and being electromagnetically coupled to said inner rotor to be rotated by rotation of said inner rotor and being mechanically coupled to said flywheel to rotate said flywheel in association with said outer rotor whereby said flywheel is driven via said main gear under certain conditions and drives said main gear under other conditions.

2. The standby power generating power system defined in claim 1 further including a control unit which includes:
  (1) a sensor connected to the main power source,
  (2) a switch connected to said motor/generator and to said sensor to operate said motor/generator as a motor when power from the main power source is above a pre-set level and to operate said motor/generator as a generator when power from the main power source is at or below said pre-set level, and
  (3) a second switch connected to said engine and to said sensor to activate said engine when power from the main power source is at or below said pre-set level.

3. The standby power generating power system defined in claim 2 wherein the first and second gears of the gear unit of said coupling unit are oriented to rotate in planes that are oriented at 90° with respect to the plane of rotation of the third gear.

4. The standby power generating power system defined in claim 3 wherein the output shaft of said engine and the input/output shaft of said motor/generator are oriented in a horizontal plane.

5. The standby power generating power system defined in claim 4 wherein the outer rotor of said electromechanical coupling is a squirrel cage.

6. The standby power generating power system defined in claim 3 further including clutches on the output shaft of said engine and on the input/output shaft of said motor/generator.

7. The standby power generating system defined in claim 1 further including a second power generating system which includes a second frame, a second engine mounted on said second frame and having a output shaft associated therewith, a second motor/generator mounted on said second frame and having an input/output shaft associated therewith; a second flywheel mounted on said second frame to rotate in a horizontal plane, a second coupling unit coupling together said second engine, said second motor/generator and said second flywheel and including a second gear unit which includes one gear on the output shaft of said second engine, another gear on the input/output shaft of said second motor/generator, yet another gear meshed with said one gear and said another gear, and a second electromagnetic coupling which includes an interior rotor mounted to rotated in a horizontal plane and including a shaft coupled to said yet another gear so that said interior rotor rotates with said yet another gear, an exterior rotor mounted to rotate in a horizontal plane and being electromagnetically coupled to said interior rotor to be rotated by rotation of said interior rotor and being mechanically coupled to said second flywheel to rotate said second flywheel in association with said exterior rotor, and further including a system coupling unit coupling said second standby power generating system to the load.

8. The standby power generating system defined in claim 1 further including a further gear unit coupling said outer rotor to said flywheel.

9. The standby power generating system defined in claim 8 wherein said further gear set includes a gear on said outer rotor and a gear on said flywheel whereby said flywheel rotates at a speed different from the speed of rotation of said outer rotor.

10. A standby power generating system comprising:

A) a frame;

B) an engine mounted on said frame and having an output shaft;

C) a motor/generator mounted on said frame and having an input/output shaft and being connected to a load that is powered from a main power source;

D) a flywheel mount on said frame to rotate in a horizontal plane; and

E) a coupling unit coupling together said engine, said motor/generator and said flywheel and including
  (1) a gear nit which includes a bevel gear,
  (2) an electromagnetic coupling which includes
    (a) an inner rotor mounted to rotated in a horizontal plane and including a main shaft coupled to said third gear so that said inner rotor rotates with said third gear,
    (b) an outer rotor mounted to rotate in a horizontal plane and being electromagnetically coupled to said inner rotor to be rotated by rotation of said inner rotor and being mechanically coupled to said flywheel to rotate said flywheel in association with said outer rotor whereby said flywheel is driven via said main gear under certain conditions and drives said main gear under other conditions.

11. The standby power system defined in claim 10 wherein said flywheel rotates aster than said motor/generator.

12. The standby power system defined in claim 1 wherein the outer rotor of the electromagnetic coupling of said coupling unit rotates faster than the inner rotor of the electromagnetic coupling of said coupling unit.

13. A standby power generating system comprising:

F) a skid;

G) an engine mounted on said skid and having an output shaft oriented in a first plane;

H) a motor/generator mounted on said skid and having an input/output shaft oriented in a second plane;

I) a flywheel mounted on said skid to rotate in a horizontal plane and having an input/output axle oriented in a third plane;

J) an electromagnetic coupling unit coupling the output shaft of said engine an the input/output shaft of said motor/generator to the input/output axle of said flywheel.

14. The standby power generating system defined in claim 13 wherein said first and third planes are oriented at 90° with respect to each other.

15. The standby power generating system defined in claim 14 wherein said second an said third planes are oriented at 90° with respect to each other.

16. The standby power generating system defined in claim 15 wherein said third plane is horizontal.

17. The standby power generating system defined in claim 14 wherein said third plane is horizontal.

18. The standby power generating system defined in claim 14 wherein said coupling unit includes mechanical gears.

19. The standby power generating system defined in claim 18 wherein said coupling nit further includes an electromagnetic coupling.

20. The standby power generating system defined in claim 13 wherein said third plane is horizontal.

* * * * *